(12) United States Patent
Scott

(10) Patent No.: US 8,753,105 B2
(45) Date of Patent: Jun. 17, 2014

(54) MANUFACTURING APPARATUS AND METHOD

(75) Inventor: Simon Peter Scott, Staffordshire (GB)

(73) Assignee: MTT Technologies Ltd., Gloucestershire (GB)

( * ) Notice: Subject to any disclaimer, the term of this patent is extended or adjusted under 35 U.S.C. 154(b) by 519 days.

(21) Appl. No.: 13/054,695

(22) PCT Filed: Jul. 20, 2009

(86) PCT No.: PCT/GB2009/001797
§ 371 (c)(1),
(2), (4) Date: Aug. 15, 2011

(87) PCT Pub. No.: WO2010/007394
PCT Pub. Date: Jan. 21, 2010

(65) Prior Publication Data
US 2011/0291331 A1    Dec. 1, 2011

(30) Foreign Application Priority Data

Jul. 18, 2008    (GB) .................................. 0813241.7

(51) Int. Cl.
*B29C 43/00*    (2006.01)

(52) U.S. Cl.
USPC ............ 425/338; 425/317; 425/363; 264/510

(58) Field of Classification Search
None
See application file for complete search history.

(56) References Cited

U.S. PATENT DOCUMENTS

| | | |
|---|---|---|
| 4,863,538 A | 9/1989 | Deckard |
| 5,155,324 A | 10/1992 | Deckard |
| 5,316,580 A | 5/1994 | Deckard |
| 5,427,733 A | 6/1995 | Benda |
| 5,786,562 A | 7/1998 | Larson |
| 5,846,370 A | 12/1998 | O'Connor |
| 6,554,600 B1 | 4/2003 | Hofmann |
| 6,621,039 B2 | 9/2003 | Wang et al. |
| 7,204,684 B2 | 4/2007 | Ederer |
| 7,874,445 B2 | 1/2011 | Hochsmann |
| 7,976,302 B2 | 7/2011 | Halder |
| 2004/0045941 A1 | 3/2004 | Herzog |
| 2005/0116391 A1 | 6/2005 | Lindemann et al. |
| 2006/0048706 A1 | 3/2006 | Cheong |
| 2006/0141089 A1 | 6/2006 | Larsson |
| 2006/0219671 A1 | 10/2006 | Merot |
| 2007/0001342 A1 | 1/2007 | Oberhofer |
| 2007/0057412 A1 | 3/2007 | Weiskopf |
| 2007/0126157 A1 | 6/2007 | Bredt |
| 2008/0131540 A1 | 6/2008 | Perret |

(Continued)

FOREIGN PATENT DOCUMENTS

| | | |
|---|---|---|
| CN | 1135732 A | 11/1996 |
| CN | 1476362 A | 2/2004 |

(Continued)

OTHER PUBLICATIONS

Exner, H. et al. "Selective Laser Micro Sintering with a Noven Process" (2004), Proceedings of SPIE, vol. 5063, 9. 145-151.

(Continued)

*Primary Examiner* — Monica Huson
(74) *Attorney, Agent, or Firm* — Nexsen Pruet, LLC

(57) ABSTRACT

An apparatus for manufacturing a three-dimensional object by layerwise consolidation of powder comprises a lowerable build platform for supporting the object during manufacture and a sealable chamber for controlling the atmosphere around the object. The apparatus also has gas transport devices, such as pumps and valves. Substantially all of the gas transport devices are maintained within a controlled atmosphere.

35 Claims, 4 Drawing Sheets

(56) References Cited

U.S. PATENT DOCUMENTS

Figure 1:
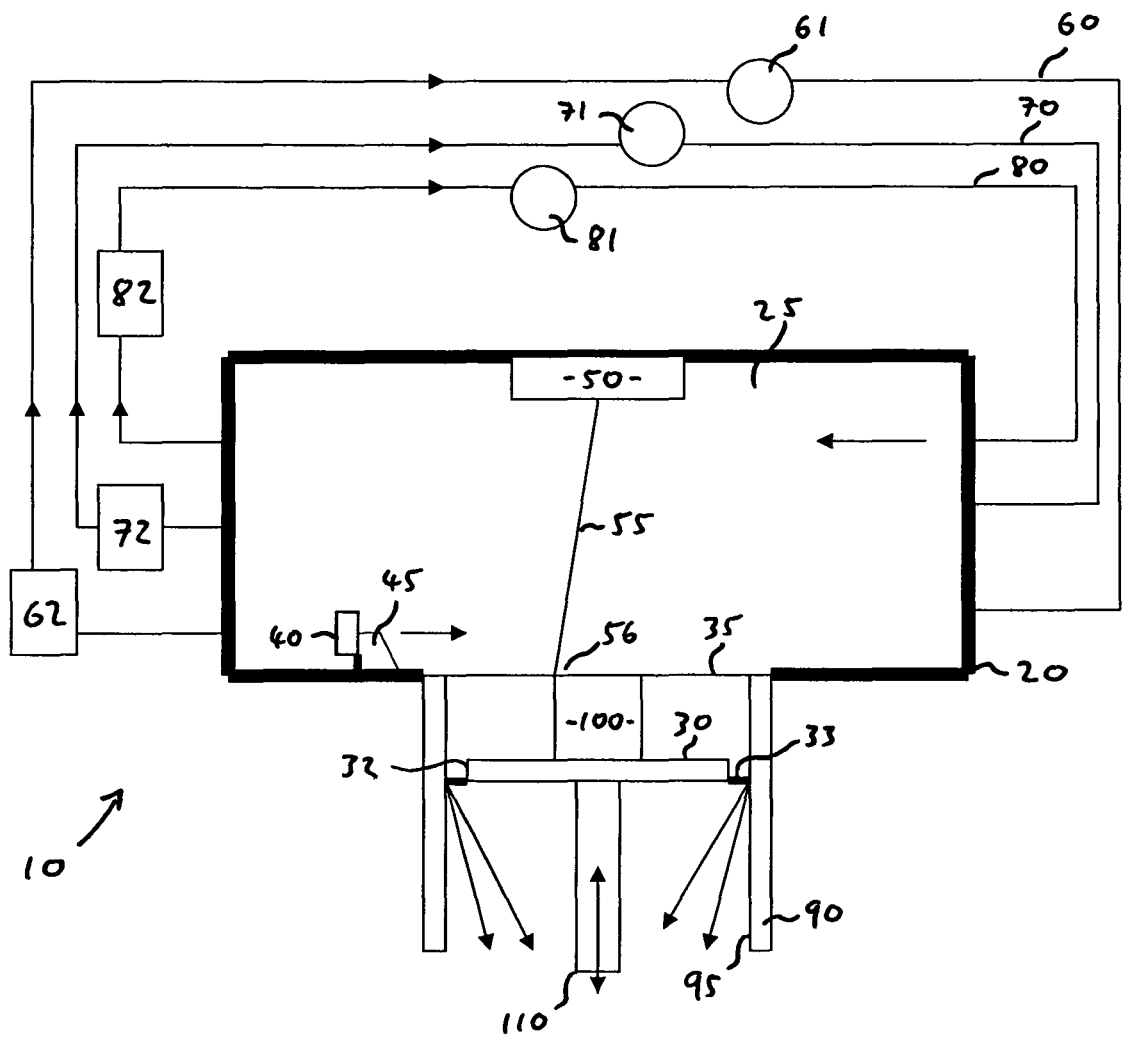

2008/0190905 A1    8/2008  Heinlein
2010/0043698 A1    2/2010  Bolt

FOREIGN PATENT DOCUMENTS

| CN | 1130684 P | 6/2013 |
|---|---|---|
| DE | 19952998 | 4/1999 |
| DE | 199 52 998 A1 | 5/2001 |
| DE | 102004057866 | 6/2010 |
| EP | 2323787 | 5/2011 |
| EP | 1118692 A1 | 7/2011 |
| WO | WO 2004/056512 A1 | 7/2004 |
| WO | WO 2011/067301 | 6/2011 |

OTHER PUBLICATIONS

Ebert, R. et al. "Process Assembly for urn-Scale SLS, Reaction Sintering, and CVD" (2004), Proceedings of SPIE, vol. 5063, p. 183-188.

IB, International Search Report, PCT/GB2009/001797, Nov. 20, 2009.

European Patent Application No. 13 164 710.9; Office Action Dated Feb. 7, 2014; (Total of 4 pages).

Notification of the First Office Action, State Intellectual Property Office of People's Republic of China, Oct. 9, 2012.

English Translation of above Foreing Office Action as received with the Office Action, 2012.

CN200980132011.2—Office Action, Nov. 27, 2013—16 pages. total (Set of 7 Pages; Set of 9 Pages) Translation Included.

CN200980132011.2, State Intellectual Property Office of People'S Republic of China, The Second Office Action, Jun. 24, 2013, 10 Pages Total (Set of 3 Pages; Set of 7 Pages) Translation.

EP13164710.9-1362, EP Search Report, European Patent Office, Jun. 26, 2013, 5 Pages Total.

Process Assembly for UM-Scale SLS, Reaction Sintering, and CVD, Ebert et al., Jul. 15, 2011, 6 Pages Total.

European Office Action; Application No. 09 784 749.5; Feb. 15, 2013; p. 2; Sections-4.

European Patent Application No. EP 13 17 6494; Partial European Search Report, dated Dec. 16, 2013 (4 pages).

US 8,753,105 B2

MANUFACTURING APPARATUS AND METHOD

CROSS-REFERENCE TO RELATED APPLICATIONS

This U.S. National Stage Application arises from PCT/GB2009/001797, filed 20 Jul. 2009, which itself claims priority to GB Application Number 0813241.7, filed 18 Jul. 2008.

FIELD OF THE INVENTION

The invention relates to the configuration and operation of an apparatus for producing a three-dimensional object using an additive manufacturing process. In particular, the invention relates to the configuration of a machine for rapid manufacturing or rapid prototyping such as a selective laser sintering (SLS) or selective laser melting (SLM) process.

BACKGROUND TO THE INVENTION

Additive manufacturing or rapid prototyping methods for producing three-dimensional components are well known in the art (see for example U.S. Pat. No. 4,863,538-Deckard). There are various known methods of additive manufacturing including consolidation of powder materials and curing of polymeric resins. This invention relates to methods that involve powders. Such methods involve a layer-by-layer consolidation of powder material using a focused energy beam, such as a laser beam or an electron beam. Initially, the use of such freeform fabrication processes was restricted to the production of prototypes by sintering together layers of powder particles. Recent advances in technology, however, have meant that fully dense, high integrity components can be manufactured by freeform fabrication of components.

In a typical selective laser sintering (SLS) or selective laser melting (SLM) process, a thin layer of powder is deposited over a build area or powder bed within a SLS or SLM apparatus. A focused laser beam is scanned across portions of the powder layer that correspond to a cross-section of the three-dimensional article being constructed such that the powder at the points where the laser scans is consolidated either by sintering or by fusion. The cross-section is typically generated from a 3-D description of the component generated by scanning an original component or from computer-aided design (CAD) data.

After consolidation of a layer, the build surface is lowered by the thickness of the newly consolidated layer and a further layer of powder is spread over the surface. Again, the surface is irradiated with a laser beam in portions of the layer that correspond to a cross-section of the three-dimensional article, the newly consolidated layer being joined to the initial consolidated layer. This process is repeated until the component is completed.

In order to consistently manufacture an object with the desired structural properties it is important to maintain a controlled atmosphere, often a low oxygen content atmosphere, in the vicinity of the build surface during manufacture. Existing equipment achieves this by flooding a build chamber, which surrounds the build surface, with an inert gas. This inert gas is supplied at a slight overpressure compared with atmospheric pressure and allows the oxygen content of the atmosphere within the build chamber to be substantially reduced to about one percent oxygen. A low oxygen atmosphere in the region of the build plate allows the powder to be heated, and where necessary melted, without undergoing excessive undesirable oxidation reactions.

FIG. 1 illustrates a typical arrangement of a build chamber 20 in a prior art rapid prototyping system 10. The build chamber 20 defines a space 25 above a lowerable build platform 30 and is constructed with sufficient integrity to be flooded with inert gas at a slightly elevated pressure. The build chamber 20 contains a powder dispensing and coating apparatus 40 for spreading powder 45 over the surface of the build platform and a window in an upper wall of the chamber 50 allows optical access to a laser beam 55 for irradiating powder spread at a build surface 35. Thus, any sintering and/or melting operations at the point of interaction between the laser beam and powder 56 occur in a low oxygen atmosphere.

The build chamber is supplied with a number of different gas transport circuits 60, 70, 80, each gas transport circuit having its own pump 61, 71, 81, and its own filter 62, 72, 82.

The build platform is arranged to be lowerable within the bore 95 of a build cylinder 90, which allows the build surface 35 to remain in substantially the same position within the machine while an object 100 is built up from successive powder layers. The build platform is typically lowered by a piston mechanism 110 and its edge 32 incorporates a seal 33 that engages with the bore 95 of the build cylinder 90 to prevent egress of powder 45 from the build cylinder.

This prior art system presents a number of disadvantages. Overpressure in the build chamber tends to force powder through the seals between the build platform and the bore of the build cylinder (illustrated by arrows in FIG. 1). This results in loose powder becoming deposited within the apparatus, from where it must be cleaned, and may also compromise the integrity of the seal and allows oxygen to enter the build chamber during manufacture.

Gas transport devices such as pumps, valves and pipes are all prone to leaks, particularly at connection points. Any oxygen leaking into such a point in the gas transport system can compromise the integrity of the low oxygen atmosphere in the build chamber.

SUMMARY OF INVENTION

The invention provides an apparatus for manufacturing a three-dimensional object and a method of forming a three-dimensional object as defined in the appended independent claims to which reference should now be made. Preferred or advantageous features of the invention are defined in dependent sub-claims.

Thus, in a first aspect an apparatus for manufacturing a three-dimensional object by layerwise, or layer by layer, consolidation of powder is provided. The apparatus comprises a lowerable build platform for supporting the object during manufacture and a sealable chamber for controlling the atmosphere surrounding the object.

Preferably the apparatus is arranged so as to allow maintenance of a controlled atmosphere, for example a low oxygen atmosphere, both above and below the build platform.

In a conventional apparatus an inert, low oxygen, atmosphere is maintained only in the region above a build platform. This inert atmosphere is usually maintained at a different pressure from the pressure below the platform. If the pressure above the platform is greater than below, powder is naturally forced between a seal existing between the build platform and a bore of a build cylinder that the platform slides within. By controlling the atmosphere both above and below the build platform, i.e. on both sides of the seal formed between the build platform and the build cylinder, to have the same pressure this disadvantage of prior art systems can be avoided. It is preferred that the composition of the atmosphere is also maintained, i.e. low oxygen both above and below the build platform. This means that, if powder is trapped in the seal, any back leakage of gas from below the build platform will not compromise the build atmosphere.

It is noted that similar problems exist if the build chamber is maintained at a low pressure and the region below the build platform is at a relatively higher pressure, and these problems can be alleviated by controlling the atmosphere both above and below the build platform.

The build cylinder, which defines a build volume, is not necessarily circular. In fact the build cylinder is more likely to be of square or rectangular cross-section.

It is preferred that the apparatus is constructed such that low pressure or a vacuum pressure can be applied both above and below the build platform. In order to achieve this the construction of the apparatus must be of high integrity, i.e. free of cracks and apertures that open to the external environment, and must be sealable at any points of access to the external environment. Methods of adapting access openings of a chamber for vacuum use are well known in the art, for example, the use of O-ring seals on doors.

It is particularly preferable that the apparatus allows the application of an over pressure both above and below the build platform.

Advantageously, the apparatus further comprises means for connection to a gas supply for maintaining an inert gas atmosphere both above and below the build platform. Such means could, for example, be a gas valve connection for connecting to a cylinder of inert gas, such as argon or nitrogen.

In a particularly preferred embodiment the apparatus comprises two separate sealable chambers. An upper chamber or build chamber allows the atmosphere surrounding the object and in the region of the build surface to be controlled and a lower chamber allows the atmosphere on the lower side of the build platform to be controlled. This may be advantageous as the operation of the apparatus may require specific inert gas flows near the object, for instance an optical shield flow. It may be simpler to provide these specific gas flows if the build chamber is separate to a further sealable chamber for controlling the atmosphere below the build surface.

Particularly preferably, in the situation where the apparatus comprises upper and lower sealable chambers a valve or opening extends between the chambers allowing pressure and/or gas composition and/or temperature to be equalised.

The apparatus may include one or more pumps for evacuating air from the chamber or chambers, supplying an overpressure of gas and for driving any gas circuits within the apparatus.

In some circumstance it may be advantageous that at least one and preferably all pumps are contained within an inert atmosphere, preferably within the lower chamber.

It may also be advantageous that at least one and preferably all gas-valves on the apparatus are contained within an inert atmosphere.

It may also be advantageous that substantially all elements of any gas transport circuit of the apparatus are housed in inert atmosphere or low oxygen atmosphere preferably within the lower chamber.

The advantage of maintaining the gas transport devices, elements, and pumps within a controlled atmosphere is that, if any of the elements develops a leak then the leak has the composition of the controlled atmosphere of the build chamber. Gas leaked into the pump or circuit is therefore of substantially the same composition as the gas within the circuit and should not substantially affect the integrity of the component. For some applications, the housing of gas transfer components in a low oxygen atmosphere may substantially improve the reliability of the apparatus and thus the reproducibility of objects formed using the apparatus.

Pumps and valves forming part of a gas transport circuit may be included within the term gas transport devices. Likewise, the pumps and valves for pumping out the build chamber of an apparatus and for maintaining an inert gas supply may also be included within this term. It is advantageous that any joints in the pipework of a gas transport circuit or gas transport system are also maintained within the controlled atmosphere. It is further advantageous that substantially all of the pipework itself is maintained within the controlled atmosphere.

In an apparatus having more than one gas circuit supplying streams of gas to a build chamber it may be advantageous that all gas transport circuits can be driven by a single pump connected to the circuits by means of appropriate valves. This arrangement can reduce the number of components within the apparatus.

In a preferred embodiment the apparatus has a build platform that comprises part of and is lowerable within the bore of a build cylinder. The build cylinder defines a build volume and the build platform lowers into the build cylinder to ensure that the build surface of the object remains at substantially the same level within the apparatus as successive layers are added to the object or work piece. Preferably the entire build cylinder is removably mounted within the apparatus such that it can be simply and swiftly removed at the end of a forming operation and replaced with a new build cylinder. Preferably the entire build cylinder is mounted such that it can be surrounded by a controlled, or low oxygen, atmosphere during operation of the apparatus.

In a second aspect the invention provides a method of forming a three-dimensional object by layerwise consolidation of powder comprising the steps of controlling the atmosphere surrounding both an upper and lower portion of a lowerable build platform and consolidating portions of successive layers of powder at a build surface supported on the upper surface of the build platform in order to form the object. Typically consolidation of portions of the successive layers will be achieved by means of a focused laser beam.

Preferably the atmosphere above and below the build platform is controlled to be the same pressure and/or temperature and/or composition.

Particularly preferably upper and lower portions of the build platform contact an atmosphere in separately sealable chambers and the method further comprises the step of equalising the pressure between these two chambers.

A preferred embodiment of the invention will now be described with reference to figures in which.

FIG. 1 illustrates schematically the gas flow circuits and build chamber in a typical prior art powder processing apparatus.

Figure 2:
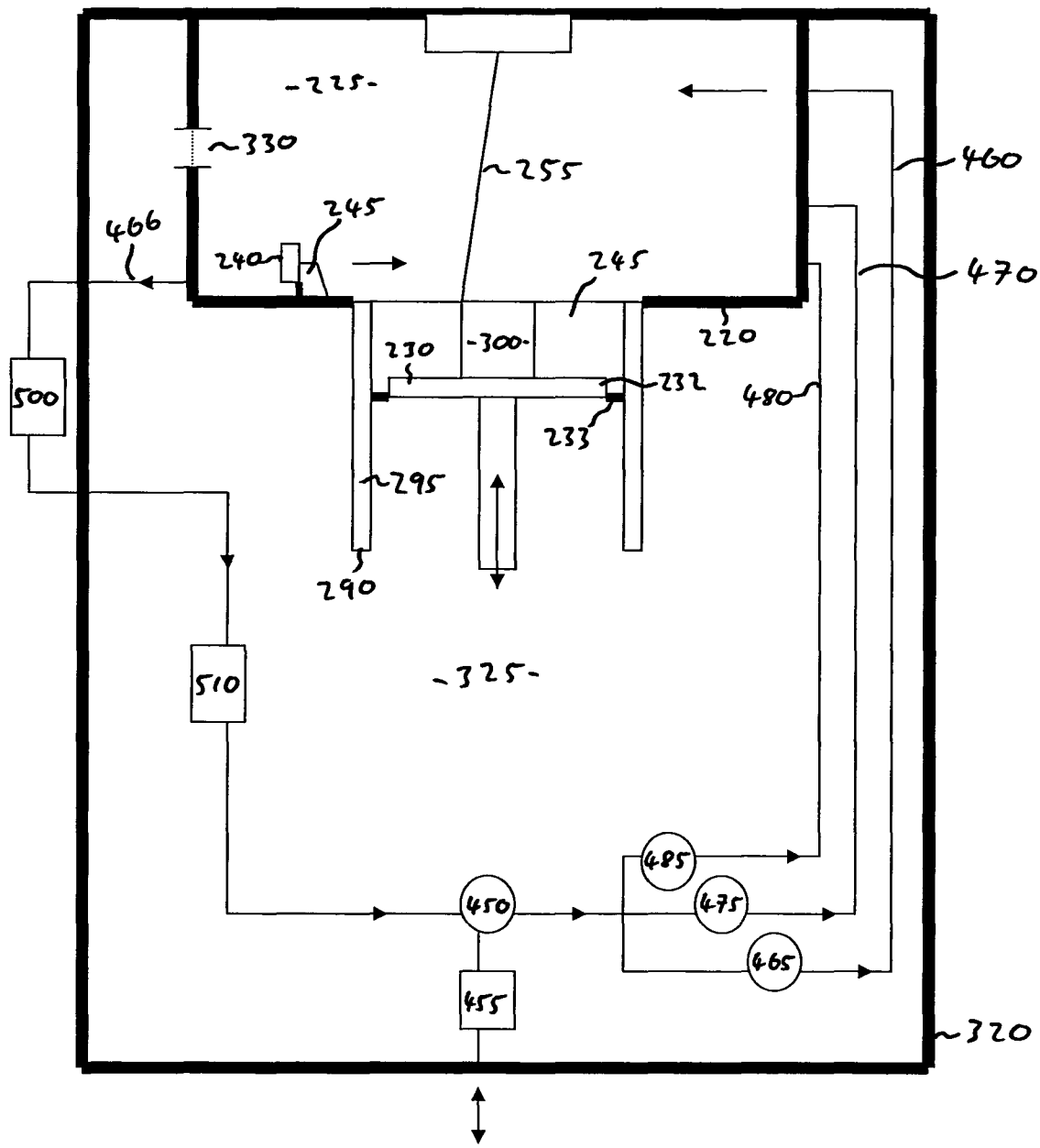

FIG. 2. illustrates the configuration of chambers and gas transport systems in an apparatus according to the invention.

Figure 3:
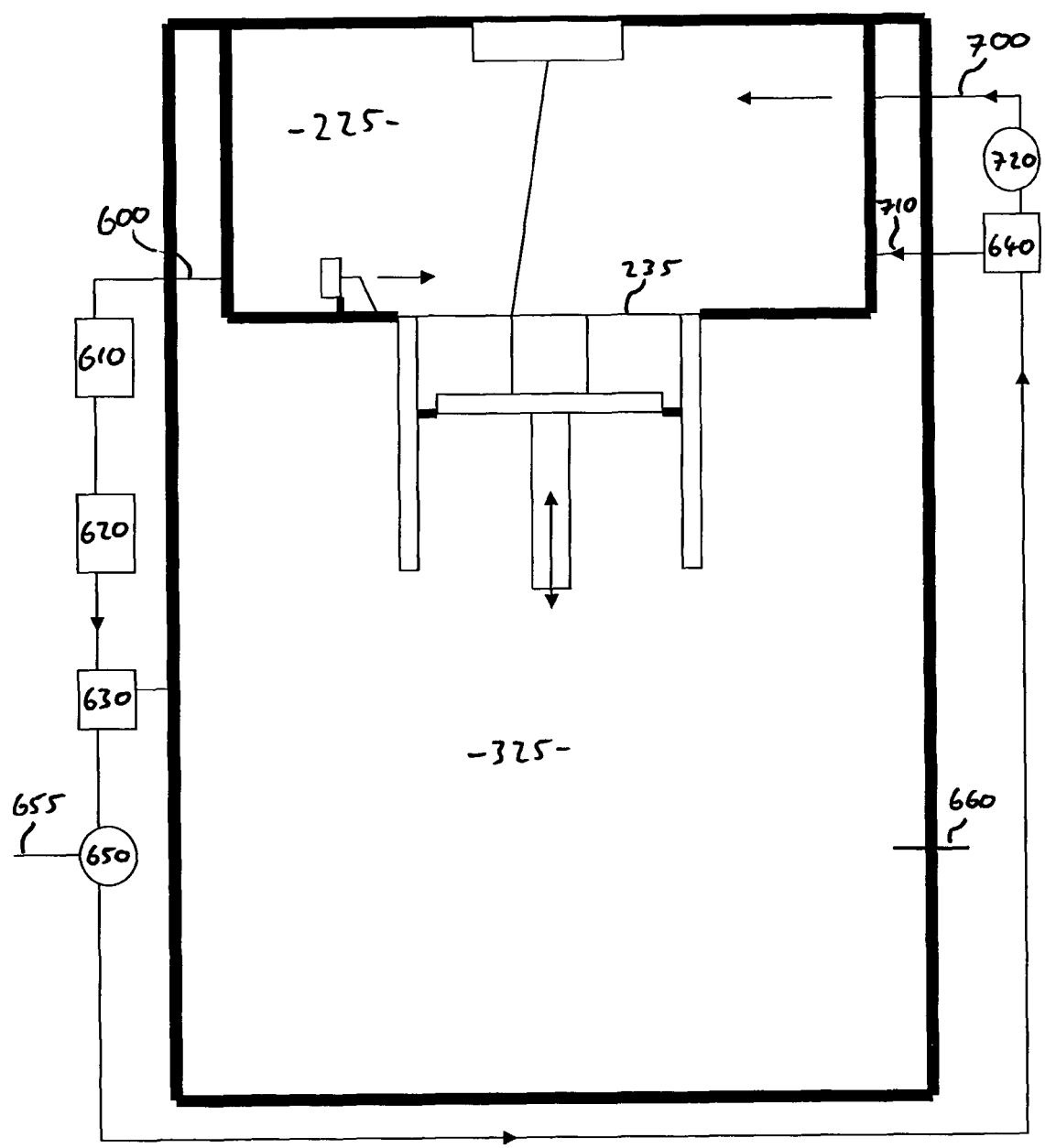
Figure 4:
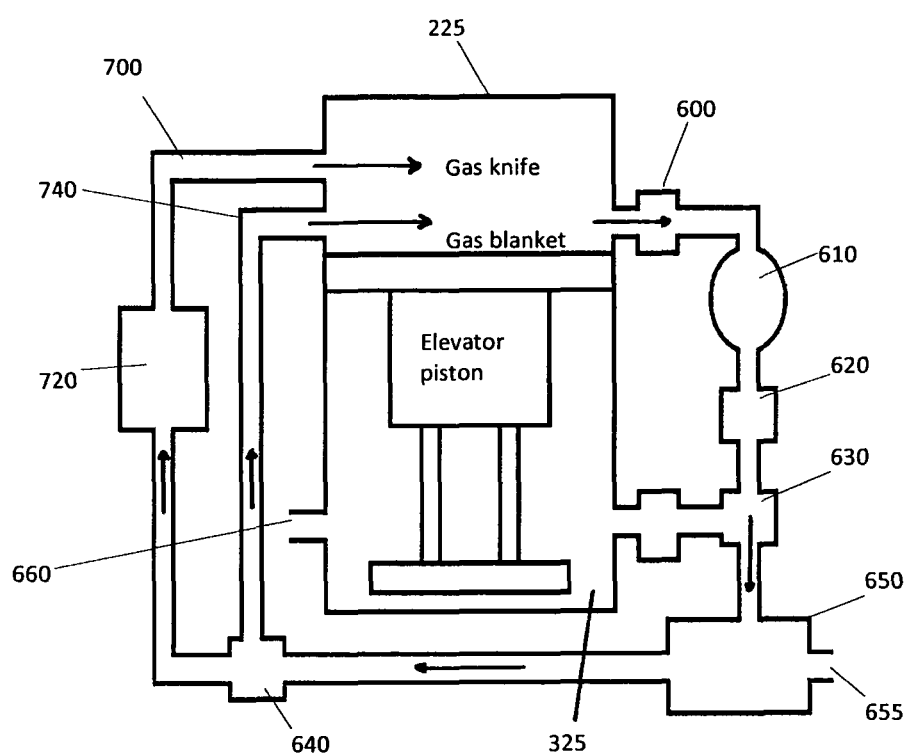

FIGS. 3 and 4 illustrate alternative configurations of gas transport systems in an apparatus according to the invention.

With reference to FIG. 2, an additive manufacturing apparatus 200 according to an embodiment of the invention includes a build chamber or process chamber 220 that can be sealed from the external environment and encloses a build surface 235 on which a three-dimensional object 300 can be formed. The build chamber 220 houses a powder spreading means 240, for spreading a layer of powder 245 over the build surface 235, and allows optical access to a high powered laser beam 255 for scanning over the build surface 235 to consolidate successive layers of powder. The build surface 235 is supported by a build platform 230 that is reciprocally moveable within the bore 295 of a build cylinder 290 such that it can be lowered to accommodate the object 300 as it is formed layer by layer. The build platform 230 is sealably engaged with the bore 295 of the build cylinder 290 to maintain the atmosphere within the build chamber and to prevent egress of powder 245. This is achieved by seals 233, for example silicone seals, associated with an edge 232 of the build platform 230 that physically engage with the bore 290 of the build cylinder. The atmosphere directly above the build platform is subject to the atmosphere 225 of the build chamber even as the build platform is lowered.

In addition to the upper build chamber 220 the apparatus further defines a lower chamber 320 in which the atmosphere 325 may be similarly controlled. This lower chamber 320 allows the atmosphere below the build platform 230 to be controlled.

The upper and lower chambers 220, 320 are coupled to each other via an opening 330 that allows the pressure in each chamber to be equalised. Preferably there is a filter within the opening to prevent powder and soot from entering the lower chamber. This arrangement provides the advantage that the pressure immediately above and below the build platform may be maintained at the same level, for example slightly higher than atmospheric pressure.

A single pump 450 for generating and maintaining atmosphere in both upper and lower chambers is situated within the lower chamber. The pump is connected to a degassing valve 455 for communication with the external atmosphere and to first 465, second 475, and third 485 circuit valves for supplying gas to first 460, second 470, and third 480 gas circuits within the build chamber 220. A filter 462 is also disposed in line within the gas circuits.

The pump 450, the valves 465, 475, 485, and ducting or piping comprising the gas circuits 460, 470, 480 are substantially entirely contained within the lower chamber 320. This allows the gas transport circuits to be surrounded by a low oxygen atmosphere such that any leaks do not substantially affect the integrity of the formed product.

In use, degassing valve 455 is opened and pump 450 is activated to degas both upper and lower chambers to a rough vacuum. Once the atmosphere has been degassed, degassing valve 455 is closed and the upper and lower chambers are backfilled with argon to a pressure of about 10 millibar. The backfilling with argon provides an elevated pressure in both upper and lower chambers to give an assurance that oxygen will not be able to leak in.

After the chambers have been filled with argon, pump 450 operates via first 465, second 475, and third 485 circuit valves to provide flow through each of the gas circuits. These valves are adjustable to allow independent control of gas flow into the build chamber through each circuit. Once the atmosphere in both the build upper and lower chambers is of desired constitution, manufacture of the three-dimensional component is carried out by layerwise consolidation of the powder using the laser beam, as is well known in the prior art.

Preferably one of the gas flow circuits is a 'gas blanket' circuit. This circuit enables a shroud of inert gas to be formed over the build surface to protect the component as it is formed. The gas blanket circuit enters the build chamber at a low level.

Preferably one of the gas flow circuits is an "optical shield" circuit. This circuit supplies a high velocity planar stream of gas at a high level within the chamber to protect the optical equipment from soot and particle build-up. Typically the optical shield circuit enters the build chamber via a narrow slit high in the chamber.

There may be other gas circuits associated with the build chamber. Each gas circuit may have its own outlet from the build chamber. In the embodiment illustrated in FIG. 2 the gas circuits combine within the build chamber and exit the build chamber via a single outlet 466 and gas passes through first and second filters 500, 510.

The first filter 500 after the gas has exited the build chamber removes any particles of powder and most soot from the gas stream. The second filter 510 is a High efficiency particulate air (HEPA) filter that removes fine dust.

In the preferred embodiment the build cylinder 290 defining the build volume is mounted within the lower chamber (with the build surface within the upper chamber) and can be quickly removed once a component has been completed. Thus, the build cylinder 290, which at the end of a build contains the consolidated object 300 surrounded by unconsolidated powder 245, can be removed and unloaded at a remote site. This not only reduces downtime of the machine between builds, but also allows potentially hazardous powder to be unloaded from the chamber in a safe location.

An alternative gas flow system for an apparatus according to the invention is schematically illustrated in FIGS. 3 and 4 (All elements other than the gas flow circuits are the same as described above in relation to FIG. 2).

In this alternative system the gas flow circuit is situated outside the lower chamber. A single exhaust 600 leads out of the chamber and a gas circuit passes through a first filter 610 and a second HEPA filter 620. The circuit also is includes first valve 630, second valve 640 and a pump 650. The pump can act on the circuit or can pump to atmosphere via exhaust 655.

In use, the pump 650 acts via first valve 630 to degas the lower chamber 325 to a rough vacuum pressure. Argon is then backfilled into the chamber via an inlet 660 until the pressure is about 10 millibar. There is a connection between the build chamber and the lower chamber to enable pressures and compositions to be equalised.

Once the atmosphere is at desired composition and pressure the pump 650 acts to transport gas through the gas flow circuits. Gas leaving the build chamber at the exhaust 600 passes in turn through the first filter 610 and the second filter 620.

The second valve 640 allows the gas circuit to be split into two parts. A first part 700 enters the build chamber at a high level and acts as an optical shield or air knife to protect optical elements of the apparatus. A second part 710 enters the build chamber at a low level and acts as a gas blanket for protecting the build surface.

If needed, further pumps could be added, for example an optical shield pump 720 could be optionally added to the circuit to enable higher pressure to be delivered to apertures opening into the build chamber in order to form the optical shield.

The invention claimed is:

1. An apparatus for manufacturing a three-dimensional object by layerwise consolidation of powder comprising,
   a lowerable build platform for supporting the object during manufacture, and
   a sealable chamber for controlling the atmosphere surrounding the object, and a
   plurality of gas transport devices, including a pump and/or one or more gas valves
   wherein the pump and/or one or more valves are housed in a chamber in which a controlled atmosphere can be maintained a gas circuit for supplying a stream of gas to the build chamber, the gas circuit comprising the plurality of gas transport devices.

2. An apparatus according to claim 1 in which a controlled atmosphere can be maintained both above and below the build platform.

3. An apparatus according to claim 1 in which the controlled atmosphere is a low oxygen atmosphere.

4. An apparatus according to claim 1 comprising a system configured to form both above and below the build platform at least one of a vacuum, reduced pressure and overpressure.

5. An apparatus according to claim 1 comprising a connector configured to be connected to an inert gas supply for maintaining an inert gas atmosphere surrounding substantially all of the gas transport devices and/or both above and below the build platform.

6. An apparatus according to claim 1 comprising a valve or opening for equalizing pressure between the upper and lower chambers.

7. An apparatus according to claim 1 further comprising a pump configured such that a controlled low oxygen atmosphere can be maintained surrounding the pump.

8. An apparatus according to claim 1 in which the atmosphere surrounding the gas transport devices is a low oxygen atmosphere.

9. An apparatus according to claim 1 comprising more than one pump configured such that a controlled low oxygen atmosphere can be maintained surrounding each pump.

10. An apparatus according to claim 1 having a gas transport circuit further comprising a filter configured such that a low oxygen atmosphere can be maintained surrounding the filter.

11. An apparatus according to claim 1 having a gas transport circuit comprising an optic shield circuit and a gas blanket circuit for controlling the atmosphere around the object during manufacture.

12. An apparatus according to claim 11 in which the optic shield circuit and the gas blanket circuits are driven by a single pump connected to the circuits via valves.

13. An apparatus according to claim 1 comprising a removable build cylinder within which the build platform is lowerable.

14. An apparatus for manufacturing a three-dimensional object by layerwise consolidation of powder comprising;
a lowerable build platform comprising a build surface for supporting the object during manufacture;
a sealable build chamber enclosing the build surface such that an atmosphere surrounding the object can be controlled, and
a lower chamber enclosing a volume separate to a volume enclosed by the build chamber, wherein a lower portion of the build platform contacts an atmosphere in the lower chamber to allow atmosphere below the build platform to be controlled.

15. An apparatus according to claim 14, wherein there is a connection between the build chamber and the lower chamber to enable the pressures in the chambers to be equalized.

16. An apparatus according to claim 14, wherein the connection comprises an opening that extends between the build chamber and lower chamber.

17. An apparatus according to claim 14, wherein a filter is provided in the opening to prevent powder and soot from entering the lower chamber.

18. An apparatus according to claim 14, wherein the connection comprises a valve extending between the build chamber and lower chamber.

19. An apparatus according to claim 14, comprising a system configured to form a vacuum or reduced pressure atmosphere both above and below the build platform.

20. An apparatus according to claim 14, comprising an inlet for backfilling inert gas into the lower chamber.

21. An apparatus according to claim 20, wherein the inlet for backfilling inert gas into the chamber is located below the build platform.

22. An apparatus according to claim 14, comprising a gas blanket circuit for forming a shroud of gas over the build surface.

23. An apparatus according to claim 14, comprising an inlet for backfilling inert gas into the lower chamber, wherein the gas blanket circuit for forming the shroud of gas over the build surface has an inlet separate from the inlet for backfilling inert gas into the chamber.

24. An apparatus according to claim 14, wherein a gas outlet leads out of the build chamber.

25. An apparatus according to claim 14, wherein the build chamber is mounted within the lower chamber and can be removed once the three-dimensional object has been completed.

26. A method of forming a three-dimensional object by layerwise consolidation of powder using and additive manufacturing apparatus, comprising the steps of,
forming a controlled atmosphere surrounding both an upper and lower portion of build platform and consolidating portions of successive layers of powder supported on the build surface of the build platform in order to form the object, wherein the upper portion of the build platform contacts an atmosphere in a build chamber and the lower portion of the build platform contacts an atmosphere in a lower chamber, the lower chamber enclosing a volume separate to a volume enclosed by the build chamber.

27. A method according to claim 26, comprising equalizing a pressure between the build chamber and the lower chamber.

28. An apparatus for manufacturing a three-dimensional object by layerwise consolidation of powder comprising,
a lowerable build platform comprising a build surface for supporting the object during manufacture,
a chamber enclosing the build surface such that an atmosphere in the chamber,
an inlet for backfilling inert gas in the chamber, and
a gas blanket circuit for forming a shroud of gas over the build surface,
wherein the gas blanket circuit for forming the shroud of gas over the build surface has an inlet separate from the inlet for backfilling inert gas into the chamber.

29. An apparatus according to claim 28, wherein the inlet for backfilling inert gas into the chamber is located below the build platform.

30. An apparatus for manufacturing a three-dimensional object by layerwise consolidation of powder comprising,
a lowerable build platform comprising a build surface for supporting the object during manufacture, and
a chamber enclosing the build surface such that an atmosphere surrounding the object can be controlled,
a system for forming a vacuum or reduced pressure atmosphere in the chamber, and
an inlet for backfilling inert gas into the chamber,
wherein the inlet for backfillinq inert gas into the chamber is located below the build platform.

31. An apparatus for manufacturing a three-dimensional object by layerwise consolidation of powder comprising, a build platform comprising a build surface for supporting the object during manufacture, the build platform lowerable within the bore of a build cylinder, a build chamber enclosing the build surface such that an atmosphere surrounding the object can be controlled, a system for forming a vacuum or reduced pressure atmosphere in the build chamber, and an inlet for backfilling inert gas into the chamber, wherein the build cylinder is removably mounted within the apparatus.

32. An apparatus for manufacturing a three-dimensional object by layerwise consolidation of powder comprising, a build platform comprising a build surface for supporting the object during manufacture, the build platform lowerable within a bore, a build chamber enclosing the build surface such that an atmosphere surrounding the object can be controlled, and a system for forming a vacuum or reduced pressure atmosphere within the build chamber, wherein the build platform is configured to sealably engage the bore to maintain an atmosphere within the build chamber.

33. An apparatus according to claim 32, wherein the build chamber encloses a volume above the build platform separated from a volume on a lower side of the build platform, the build platform configured to sealably engage the bore to enable the vacuum or reduced pressure atmosphere to be maintained within the build chamber.

34. An apparatus according to claim 32, wherein the build platform comprises silicon seals for engaging the bore to maintain the atmosphere within the build chamber.

35. An apparatus for manufacturing a three-dimensional object by layer wise consolidation of powder comprising:

a lowerable build a platform for supporting the object during manufacture, a plurality of gas transport devices including a pump and/or one or more gas valves wherein the pump and one or more valves are housed in a chamber in which a controlled atmosphere can be maintained, two sealable chambers, an upper chamber for controlling the atmosphere above the build platform and a lower chamber for controlling the atmosphere below the build platform, said gas transport devices being located in the lower chamber.

* * * * *